Oct. 26, 1965  R. C. PEARSON ETAL  3,213,763
HYDRAULIC POWER TRANSMISSIONS AND THE CONTROL
OF HYDRAULIC MOTORS
Filed May 3, 1963  6 Sheets-Sheet 1

INVENTORS:
ROBERT COLIN PEARSON
THOMAS MARK BURRETT
By E. M. Squire
ATTY.

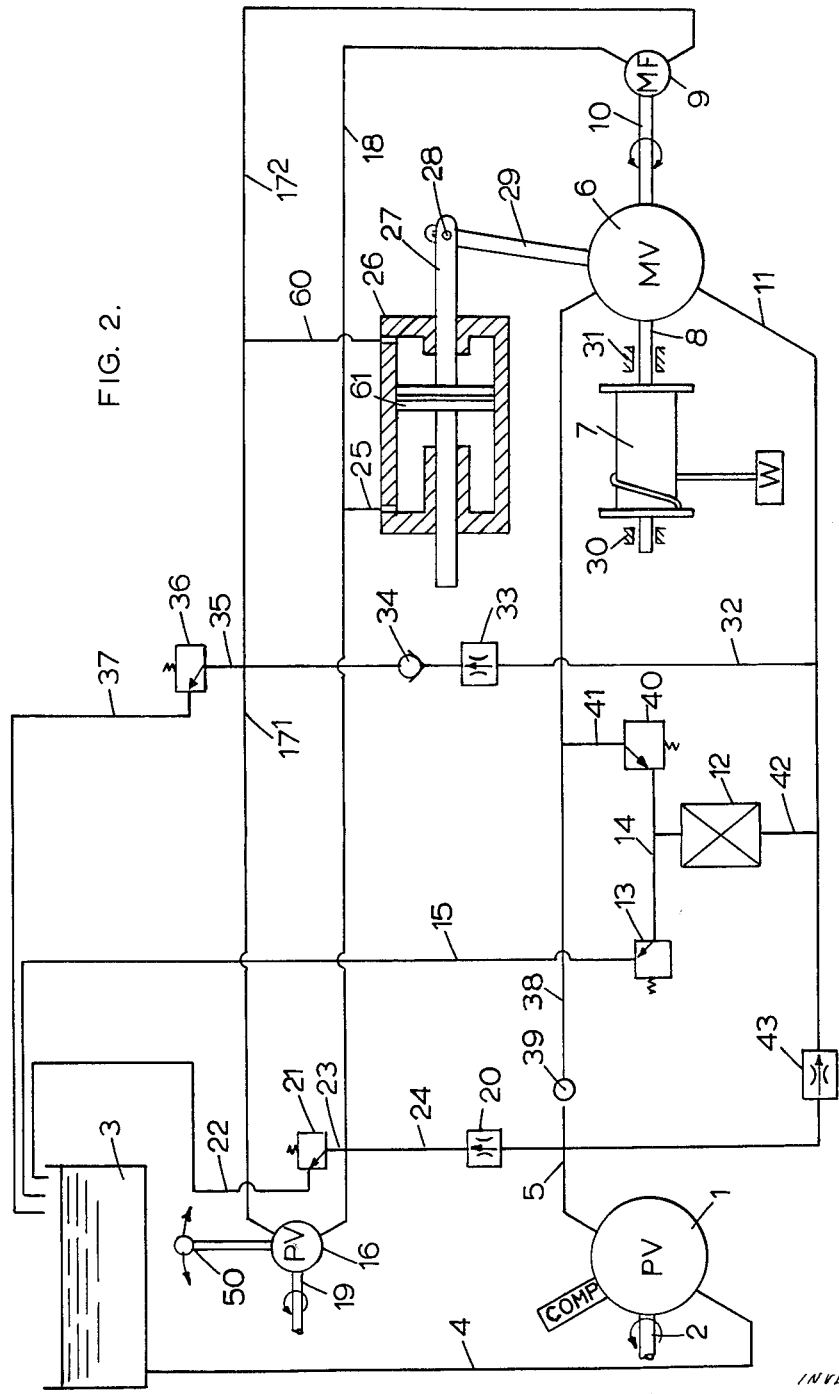

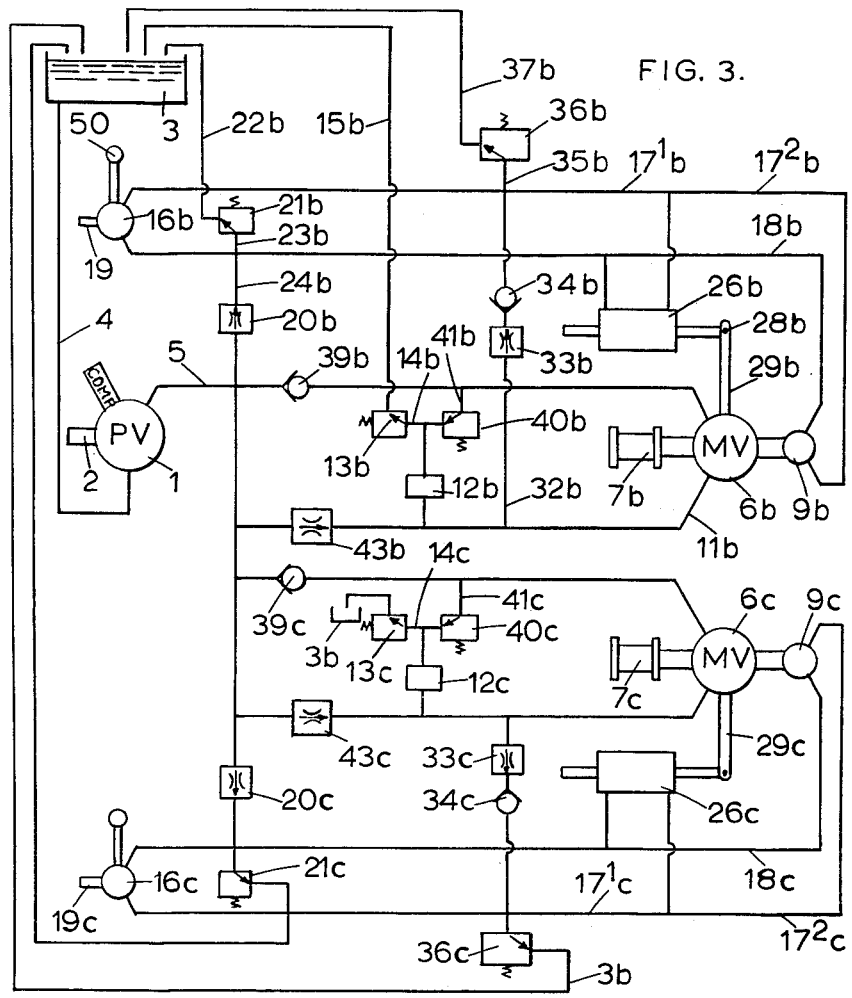
FIG. 3.
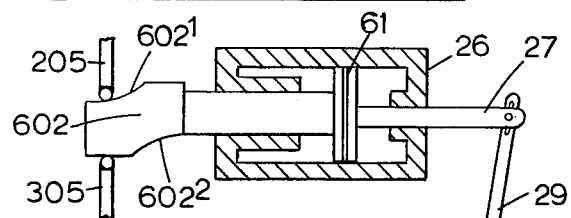
FIG. 6.
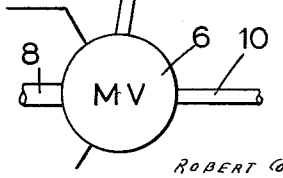
INVENTORS:
ROBERT COLIN PEARSON
THOMAS MARK BURRETT
By
E. M. Squire
ATTY.

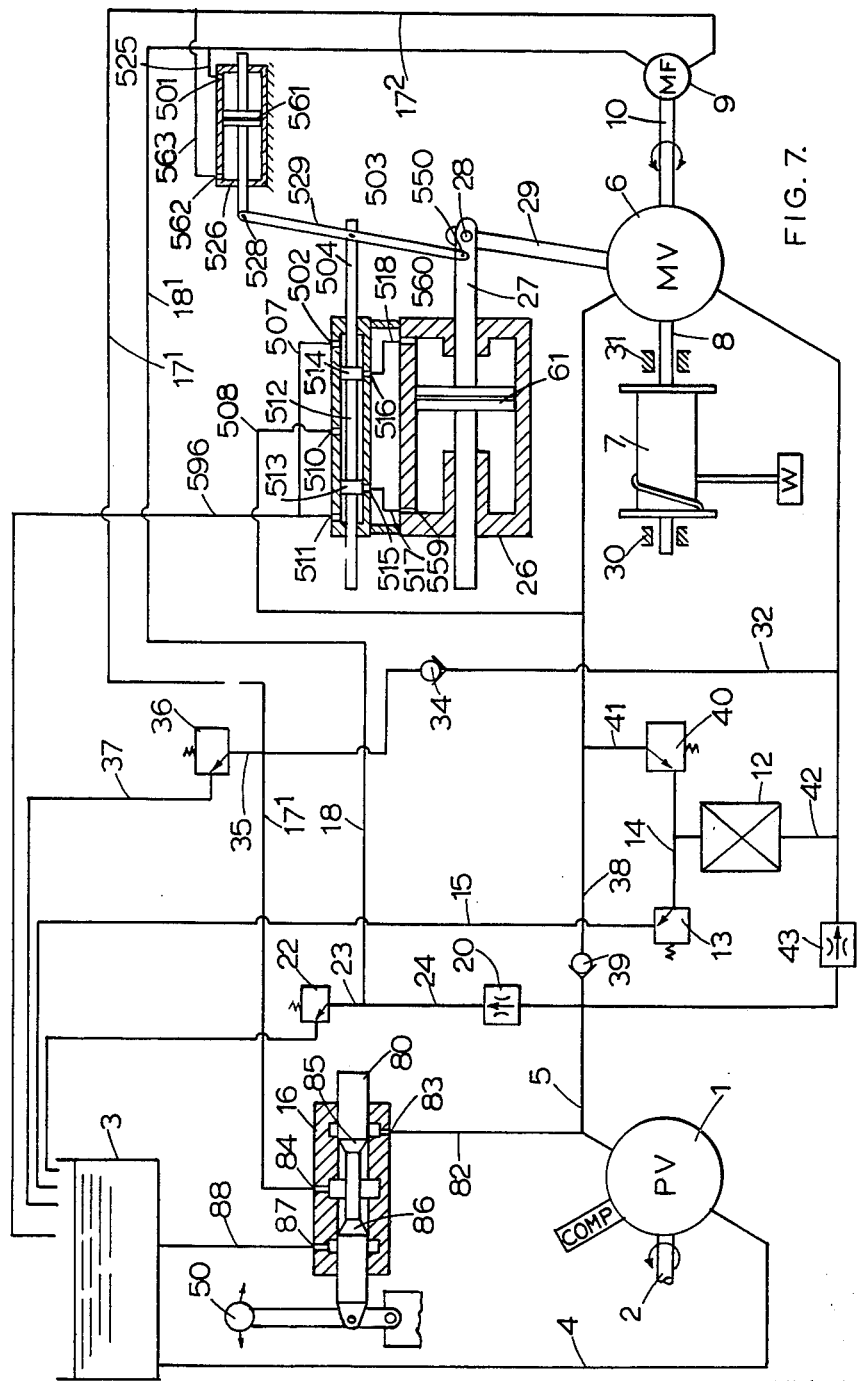

United States Patent Office 3,213,763
Patented Oct. 26, 1965

3,213,763
HYDRAULIC POWER TRANSMISSIONS AND THE CONTROL OF HYDRAULIC MOTORS
Robert Colin Pearson, "Southwold," Welton Road, Brough, England, and Thomas Mark Burrett, Brough, England; said Burrett assignor to said Pearson
Filed May 3, 1963, Ser. No. 277,795
Claims priority, application Great Britain, May 22, 1962, 19,693/62
9 Claims. (Cl. 92—13)

This invention relates to hydraulic power transmissions by which fluid power from a pump or pump set driven by a prime mover is conveyed to a motor or to a plurality of motors with or without one or more other hydraulic devices such as jacks, and in particular to the control of such motor or the individual control of one of such several motors receiving fluid from the common supply.

It will be appreciated that economy in capital cost may be achieved by supplying hydraulic pressure fluid from a common pump or pump set to a number of hydraulic motors, for example motors each driving a winch in a group of winches only a few of which winches may be required to operate at any time, as the driving horse power and pump capacity may be related to the maximum power demand from the group of winches working at any one time rather than to the sum of the maximum power demand of each winch as would be necessary if each motor was supplied from a separate pump driven by its own prime mover.

Thus in the case of a crane with three hydraulically driven prime motions of hoisting, slewing and luffing, economy is achieved when each motion is supplied from a common pump, or pump set the hoist and slew being effected by hydraulic motors, while the luffing motion may be carried out by a hydraulic jack.

In the case of an earth-moving vehicle, such as an excavator, economy is achieved when the same pump or pump set provides fluid to traction motors and to the jacks effecting the excavator motions, bucket movements, and so forth.

Where several motors or motors and other hydraulic power consuming devices are driven from a common pump or pump set, it is important that the individual or several operation of the motors should not appreciably affect the pressure supply to the other motors or hydraulic devices supplied from the common pumping source, for example, the condition must not arise in which a low output loading on a motor would cause it to overspeed and by its passage of fluid appreciably reduce the pressure of the fluid supply from the common source.

Known controls for hydraulic motors driven from a common pressure supply rely on valves, flow changing devices and so forth to control their operation and speed, which may give rise to trouble as well as power loss, and an object of the invention is to provide control of the operation of a hydraulic motor supplied with fluid from a pressure source (such as from a constant pressure pump or pump set) supplying that motor or a plurality of motors, hydraulic pumps, jacks, and other devices, without directional and/or flow controlling valves in the main circuit lines from the pump to the motor to control the direction, speed, and output torque of such motor.

A further object of the present invention is to provide such control for the hydraulic motor that it automatically adjusts its torque output to the loading upon it, and in such manner that the operation of the motor does not substantially affect the pressure supply to the other hydraulic power devices, and also to enable a loaded motor to remain substantially stationary when required to do so in spite of hydraulic leakages past its working parts.

A still further object of the invention is to provide means in such control for ensuring substantially constant maximum fluid horse power demand by the motor or each individual motor such that large torque outputs are obtained at slower speeds and low torque outputs at higher speeds, the maximum fluid horse power absorption by the motor remaining substantially constant at the maximum power setting of the control.

According to the present invention, an operation and speed control for a variable displacement hydraulic motor is achieved in that the motor is rotatably connected to a pump which passes fluid according to its speed of operation through a conduit connected to an operator operable flow control means and from which a branch leads to an actuator connected to means for varying the displacement control of the motor to vary its torque output and hence speed of operation, such that when the speed of the motor is such that the pump passes an amount of fluid different to that which passes through the operator's control means at any setting thereof the flow difference in conduit acting through its branch is effective to cause displacement of the actuator and hence adjustment of the displacement control of the motor until the motor speed is regulated to that speed at which the pump passes a flow substantially equal to that through the operator's control means.

Further according to the present invention a direction of operation and speed control for a reversible variable displacement hydraulic motor is achieved in that the motor is coupled to a pump which passes fluid according to its speed and direction of operation into and out of a conduit which connects with an operator operable directional and quantity flow control means from which a branch leads to an actuator connected with the motor displacement control such that with the direction and rate of flow through the conduit determined by the operator's control means then should the speed of the motor cause the pump to pass a quantity of fluid different from the quantity passed by the control means in its direction of flow, the flow difference is effective through the branch upon the actuator to vary the displacement of the motor and hence its speed until the motor speed in the direction of operation is such that the flow through the pump again substantially equals the flow through the flow control means.

The invention may be so carried into effect that a substantially constant pressure is maintained on the one side of the actuator, which is for example a biased actuator such as a pressure responsive device, operates according to any difference between the force on it due to such constant pressure and the opposing force on it due to the variable pressure on its opposite side due to the operation of the pump by the hydraulic motor and the setting of the operator operable flow control device.

A variable displacement hydraulic motor, which may be of the over-centre reversible type, is mechanically connected to a, preferably constant displacement, hydraulic pump which may be in a hydraulic loop control circuit branched to be effective on the actuator or pressure responsive device operative on the displacement control means of the hydraulic motor, and the operator controlled means for varying the flow in such control circuit causes the actuator to set the motor to desired rotation, or direction of operation and rotation, at required speed with rotation of the pump when, if the motor speed is less than that at which the pump passes the quantity of fluid determined at the setting of the flow control device, the resultant movement of the actuator is in a direction to increase the displacement of the motor and hence its speed, whilst should the motor speed cause the pump to pass more fluid than passes through the hydraulic flow control device at its control setting, the resultant movement of the actuator in the opposite direction so reduces the displacement of the motor and its speed, the motor speed being stable when the flow through the pump substantially corresponds with the flow through the operator's control at any particular setting thereof.

When the variable displacement motor is of the over-centre reversible flow type, the operators control reverses the direction of fluid flow into or out of the conduit as well as controls quantity so that the effect on the actuator is to move the motor displacement control to either side of its neutral central position so to govern the direction of rotation of the motor as well as its speed or rotation.

The control also governs the torque output of the motor because as the motor speed changes according to varying load thereon the resultant changes in the displacement of the motor to bring it to the desired speed changes its torque output.

The motor driven pump as a flow device may take a variety of forms, for example it may be a piston type or vane type positive displacement pump, but whatever its form the flow through such device is related to the speed of operation of the controlled motor.

The operators control may also take a variety of forms for example it may be a variable displacement pump driven at substantially constant speed and be of the over-centre reversible flow type when the controlled motor is reversible or it may comprise a flow regulating or flow regulating and flow reversing valve.

Now in order that the invention may be clearly understood embodiments thereof are, by way of example, hereinafter more fully described with reference to the accompanying drawings, which are given for purposes of illustration only and not of limitation and in which:

FIG. 2 is a circuit diagram of a hydraulic transmission comprising a pump and motor, showing the constituent elements and the motor drive and control hydraulic circuits, in which the operators control comprises a variable displacement pump.

FIG. 3 shows the circuit of a hydraulic transmission having two motors fed from a common pressure supply source or pump and each with its individual control in an arrangement similar to FIG. 2.

FIG. 6 shows a modification of part of the control illustrated in FIG. 5B, and

FIG. 7 shows the hydraulic transmission of FIG. 2 modified by servo operation of the actuator of the motor displacement control.

Figure 1:
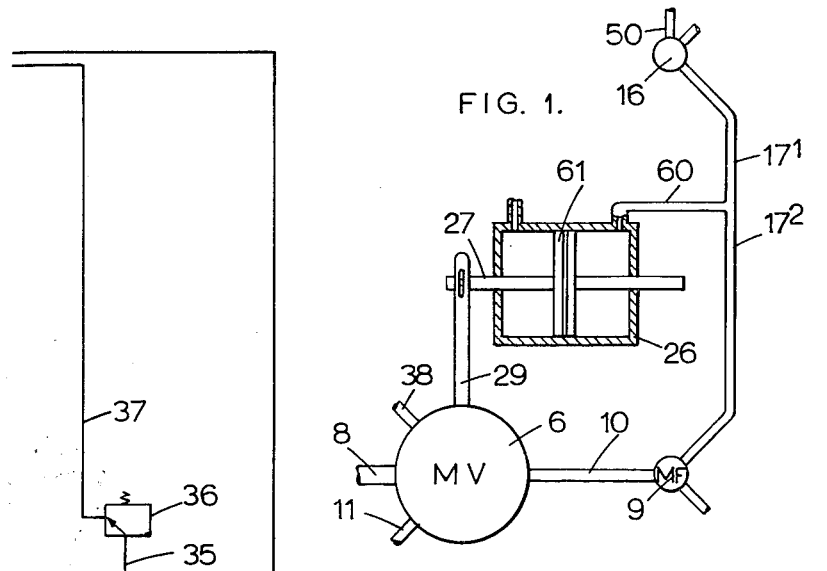
FIG. 1 shows a controlled motor, the hydraulic flow paths and actuator therefor.

Referring now to the said drawings throughout which like parts are identified by like reference numerals the invention is first briefly described with reference to FIG. 1 which shows diagrammatically the essential constituents of the motor speed controls and, thereafter it is described in more detail in particular applications. A variable displacement motor 6, which may be of the reversible over-centre type, is supplied with sufficient fluid at substantially constant pressure through the conduit 38, which fluid after passing through the motor is exhausted through the conduit 11. This motor 6 drives its output shaft 8 and through the shaft 10 also drives a tachometer pump 9 one port of which is connected to the conduit $17^2$ which extends as conduit $17^1$ to one port of a control pump 16 or other flow control device the operation and through-put of which may be varied by movement of the operators control member 50. The other port of the control pump 16 or equivalent device is connected to reservoir or to a pressure supply of liquid or the in-flow or out-flow through such connection may be controlled by a change over valve, and the second port of the tachometer pump 9 is similarly connected so that fluid may flow out therefrom or enter therethrough.

A branch conduit 60 leads from between the conduits $17^1$, $17^2$ to one end of the cylinder of a jack 26 in which is a piston 61 the piston rod of which is connected as by a pin and slot connection to the motor displacement and direction control lever 29. The piston is biased by a constant fluid pressure applied at the opposite end of the cylinder. Now, without load on the motor and with the motor at zero displacement, there is no rotation thereof in spite of the application of driving fluid pressure thereto; and also no rotation of the tachometer pump 9 while there is no flow through the flow control valve or pump 16. If now the control member 50 is moved so that there is a flow through 16, either into or out of the conduit $17^1$, and there is no flow in the conduit $17^2$ as the pump 9 is not moving, there is a flow in or out as the case may be to or from the cylinder of the jack 26 through the conduit 60 which displaces the piston 61 with consequent movement of the lever 29.

The movement of the lever 29 changes the displacement and direction of the motor 6 and the same starts to rotate and with it the pump 9. The pump 9 thus passes fluid in the same directions as the flow through 16 and as it speeds up due to the increasing motor speed may pass more fluid than is passing through 16 with the result that it draws fluid from (or feeds fluid to according to the flow direction) the jack 26 through the branch 60. This moves the piston in the opposite direction and causes change in the displacement of the motor 29 and hence of its speed with corresponding change in the speed of operation of the pump 9. When the displacement is such that the resulting motor output torque exceeds the torque resisting motion the speed of the motor increases and vice versa.

The state may be reached when the pump 9 passes less fluid than the pump 16 so that there is again a flow into (or out of) the cylinder, and therefore movements of the piston 61 until the speed of the motor 6 is such that the pump 9 again passes substantially the same quantity of fluid as the pump 16 and the piston 61 stays about its adjusted position holding the motor displacement control lever 29 until there is change in the motor speed caused by change in the load thereon and resulting displacement adjustment until the motor again runs at the correct speed or speed change is brought about by another movement of the operator's control 50 which causes changes in the flows in the conduits $17^1$ and $17^2$ and consequent movement of the piston 61.

To stop the motor 6, the flow through the pump 16 is stopped which results in movements of the piston 61 until the motor displacement is adjusted to bring the motor to rest and with it the pump 9 is stopped.

By making the flows through the conduits $17^1$, $17^2$ directional, the jack 26 will move the motor displacement control to either side of zero in the case of a reversible type motor. Otherwise the direction of flow is chosen to suit the particular application. In the neutral position of lever 29, there is no displacement of the motor. Movement of the lever in one direction causes an increase in speed in one direction and movement of lever 29 in the opposite direction from the neutral position causes an increase in speed in the opposite direction.

The effect of the flows and no-flow in the conduits $17^1$, $17^2$ may be directly applied to the jack 26 as described or may move a servo controlling the operation of such jack.

Provision may be made to limit the speed of operation of motor so that it will not draw an excess quantity of driving fluid which might reduce the pressure thereof and adversely affect the operation of another or other motors or other hydraulic device or devices supplied from the same source.

In the embodiment illustrated in FIG. 2, the pump 1, which draws fluid from the reservoir 3 through the conduit 4 and is driven by a prime mover (not shown) through the drive shaft 2, is of the pressure compensated type maintaining substantially constant pressure supply into the conduits 5 and 38 which supply pressure fluid to the inlet port of the variable displacement motor 6 which is shown as of the over-centre reversible type. The motor 6 drives a load such as the winch 7, supported on bearings 30 and 31, through the drive shaft 8 and it also drives the pump 9 either directly through the drive shaft 10 or through gearing (not shown). The pump 9 preferably, as in the example, has a fixed fluid displacement. The discharge port of the motor 6 is connected to the conduit 11 and through the conduit 42 to the cooler 12 and from there through the conduit 14, through the relief valve 13 and the conduit 15 back to the reservoir 3.

A small continuous feed is taken from the conduit 5 through the restrictor 43 (which may be a flow control valve) to the conduit 42, and thence through the cooler 12 and the relief valve 13 to the conduit 15 and back to the reservoir 3 to obtain continuous cooling and to maintain low pressure in the conduit 42 and hence in the conduits 11 and 32.

The pump 9 is in a control circuit with the operator controlled variable flow control device 16, illustrated in FIG. 1 as a variable displacement pilot pump having a lever 50 regulating the direction and quantity of output through the loop circuit conduits $17^1$–$17^2$ and 18. The pilot pump 16 is driven at constant speed through the drive shaft 19 by a prime mover (not shown) which may be the same or separate from that driving the pump 1. The conduit 18 of the control circuit is fed from the main pump discharge conduit 5 with a regulated quantity of fluid through the restrictor 20 (which may be a flow control valve) in the conduit 24, while excess fluid is relieved through the relief valve 21 which connects with the conduit 18 by the branch 23 and returns such fluid through the conduit 22 to the reservoir 3. Thus the pressure in the conduit 18 is maintained substantially constant at the relief setting of the relief valve 21. This pressure in the conduit 18 is connected through the conduit 25 to one end (the left hand end as shown) of the jack 26 and biases the piston 61 therein (to the right as shown). The piston rod 27 of this jack 26 is connected by the pin 28 (and elongated engagement hole not shown) to the displacement control arm 29 of the variable displacement motor 6.

To maintain a minimum pressure in the conduit 17 and avoid cavitation conditions as when the pump 9 is being rotated by the motor 6 with the operator's control of the pump 16 at zero displacement, a limited low pressure supply is fed from the conduit 11 through the conduit 32, the restrictor 33 (which may be a flow control valve) and the non-return valve 34. Excess pressure in this conduit is relieved through the branch 35, and the relief valve 36 which returns excess fluid through the conduit 37 to the reservoir 3.

The conduit $17^1$–$17^2$ connects through the branch conduit 60 to the other end (right hand end as drawn) of the jack 26, so that pressure in the branch 60 is effective on the right hand end of the piston 61 (as shown) of the jack 26 to oppose the bias pressure which is effective on the left hand end of that piston from the conduit 18.

Thus when the quantity of fluid flowing into the conduit $17^1$ by the setting of the operator's control pump 16 is greater than the quantity flow out of the conduit $17^2$ due to the operation of the pump 9 by the motor 6, there is a flow through the branch conduit 60 which causes the piston 61 to move the motor displacement member 29 to cause the motor 6 to increase its speed and hence the speed of the pump 9. Conversely when the quantity of fluid flowing in the conduit $17^1$ is less than that flowing in the conduit $17^2$ there is movement of the piston 61 in the opposite direction (i.e. to the right as shown) which causes the motor 6 to decrease its speed. Thus there are changes in the speed of the motor 6 until the flow in the conduit $17^1$ is substantially the same as that in the conduit $17^2$ when there is only minor movement of the piston 61, which stays about its adjusted position.

When the motor is being driven by the fluid supply pressure in the conduits 5 and 38, the outlet therefrom is into conduit 11 and so to reservoir as previously described but when, as in over-run conditions, the motor 6 is acting as a pump due to reversal by its displacement control the fluid path through the motor is reversed and fluid is discharged into the conduit 38.

The non-return valve 39 between the conduits 5 and 38 is fitted to prevent this discharge reaching the pump 1, and the discharge flow is relieved through the relief valve 40 which connects with the conduit 38 through the branch 41, thence to the cooler 12 and from there through the branch 42 to the conduit 11 which is now to the suction side of the motor 6 (acting as a pump).

The operation is as follows:

To select motion in a desired direction at a set speed, the operator moves the displacement control lever 50 from its middle neutral position in the direction desired and to an extent corresponding with the output speed required from the motor 6. Assuming that the motor 6 is required to drive the winch 7 to lift the load W and the movement of the lever 50 causes discharge from the pump 16 to draw fluid from the conduit $17^1$ and pass it into the conduit 18, and the motor control member 29 is in its neutral zero displacement position, the fluid flow into the conduit 18 is relieved through the relief valve 21 which maintains the pressure in the conduit 18 constant. The removal of fluid from the conduit $17^1$ due to action of the pump 16 reduces pressure in the conduit $17^1$. Now as one end (the left hand end as drawn) of the jack 26 connects with the constant pressure in the conduit 18, and the other end, connects with the conduit $17^1$ which is now at a reduced pressure, the piston 61 of the jack 26 moves toward the low pressure (to the right as shown) so moving the displacement control lever 29 to increase the displacement of the motor 6 to set the motor running in the desired direction with increase in torque and speed. As the motor rotates, it drives also the pump 9 which passes fluid through it proportional to its rate of operation and there is now a passage of fluid from the conduit 18 to the conduit $17^2$ which according to its quantity in relation to the quantity of flow through the pump 16 may increase the pressure in the conduit $17^2$. Thus the speed of the pump 9 increases with that of the motor 6 until its speed rises until the quantity of fluid it passes corresponds with the fluid quantity flow through the pump 16 and any flow quantity difference between the flow through the pump 16 and the flow through the motor 9 results in movement of fluid into or out of the jack 26 through the conduit 60 to decrease or increase (as the case may be) the displacement of the motor 6 to decrease or increase in its speed until the flows in the conduits $17^1$, $17^2$ correspond and the displacement of the motor 6 settles about the displacement corresponding with its torque resistance at a speed of operation corresponding to that determined by the operators control by the quantity flow through the pump 16.

Reverse directional effect is caused by opposite flow selection through the pump 16.

In this condition, the motor displacement is moved from the central position in the opposite direction, and again, but in the opposite direction of displacement, increase in displacement of the motor 6 causes an increase of torque and increase of speed, and any decrease of displacement causes a decrease of torque and a slowing down of the motor. Should the flow into the conduit $17^1$ from the pump 16 exceed the flow from the conduit $17^2$ through the pump 19, the flow difference enters the jack 26 through the conduit 60 and acts upon the piston 61 to increase the displacement of the motor 61, and hence its speed. As the speed of the motor 6 increases the flow through the pump 9 from the conduit $17^2$ increases. Should the speed of the motor 6 be such that the flow through the pump 9 from the conduit $17^2$ exceeds the flow into the conduit $17^1$ from the pump 16, fluid will flow from the jack 26 through the conduit 60 thus reducing the displacement of the motor 9 and hence its speed until the flows in the conduits $17^1$, $17^2$ correspond and the displacement of the motor 6 settles about the displacement corresponding with its torque resistance at a speed of operation corresponding to that determined by the operators control by the quantity flow through the pump 16.

In the event of a load being sustained by the winch, 7, in the stopped position, as shown in the drawing the displacement of the pump 16 is at zero and there is no flow in conduits $17^1$–$17^2$.

Should the load W tend to rotate (overhaul) the motor 6 in the lowering direction of rotation, the tendency for the motor 6 to rotate in this direction also tends to rotate the pump 9 which causes it to draw fluid from the conduit $17^2$ (while the conduit 18 remains at the pressure setting of the relief valve 21) causing the piston 61 of the jack 26 to move (to the right as shown) to increase the displacement of the motor 6, in the sense appropriate to hoist motion thus increasing its resistance to rotation by the load W.

When it is desired to lower the load W, the displacement lever 50 of the pump 16 is moved to supply fluid into the conduit $17^1$, thus increasing the flow in this conduit relative to the flow in the conduit $17^2$ due to the pump 9 so causing a flow through the branch 60 and movement of the piston 61 (towards the left) to cause reduction of the displacement of the motor 6 in the sense appropriate to hoist motion. This reduced displacement reduces the torque of the motor 6 resisting rotation and allows the motor 6 to be rotated by the descending load W (in which case the non-return valve 39 closes and the motor 6 discharges fluid through the relief valve 40 as previously described) until its speed corresponds with the speed of the pump 6 which passes substantially the same fluid quantity as the pump 16, and the displacement of the motor 6 is controlled to maintain the speed setting as described above.

If the load W was not applying during the lowering action so that the winch had to be driven in the lowering direction, the forces across the piston 61 resulting from the setting of the displacement of the pump 16 move the motor displacement control lever 29 over-centre to achieve drive in the desired direction of rotation, the speed of rotation being controlled as previously described.

The motor control described above, as well as the other embodiments which will be described later, is suited to the control of an individual motor as well as to the separate control of one of a plurality of motors supplied (with or without other hydraulic devices) from a common source such as is illustrated in FIG. 3 in which parts of the one control circuit are similarly numbered to the reference numerals used in FIG. 2 with the addition of the letter b and the parts of the other control circuit with the addition of the letter c, and the two separate motors 6b and 6c are supplied with fluid from a common constant pressure pump 1b each motor being individually speed controlled by a system analogously illustrated (and numbered) to the individual motor control system described with reference to FIG. 2.

Futhermore, one control system may be utilized to control a group of variable displacement motors in parallel driving a common drive, either by arranging for the control jack 25 to operate the displacement controls of the two or more motors jointly, which is preferred, or by use of separate control jacks 26 each responsive to the line pressures in the conduits $17^1$–$17^2$ and 18 as described, and each jack adjusting the displacement of one motor only in the group engaged on the common drive.

Figure 4:
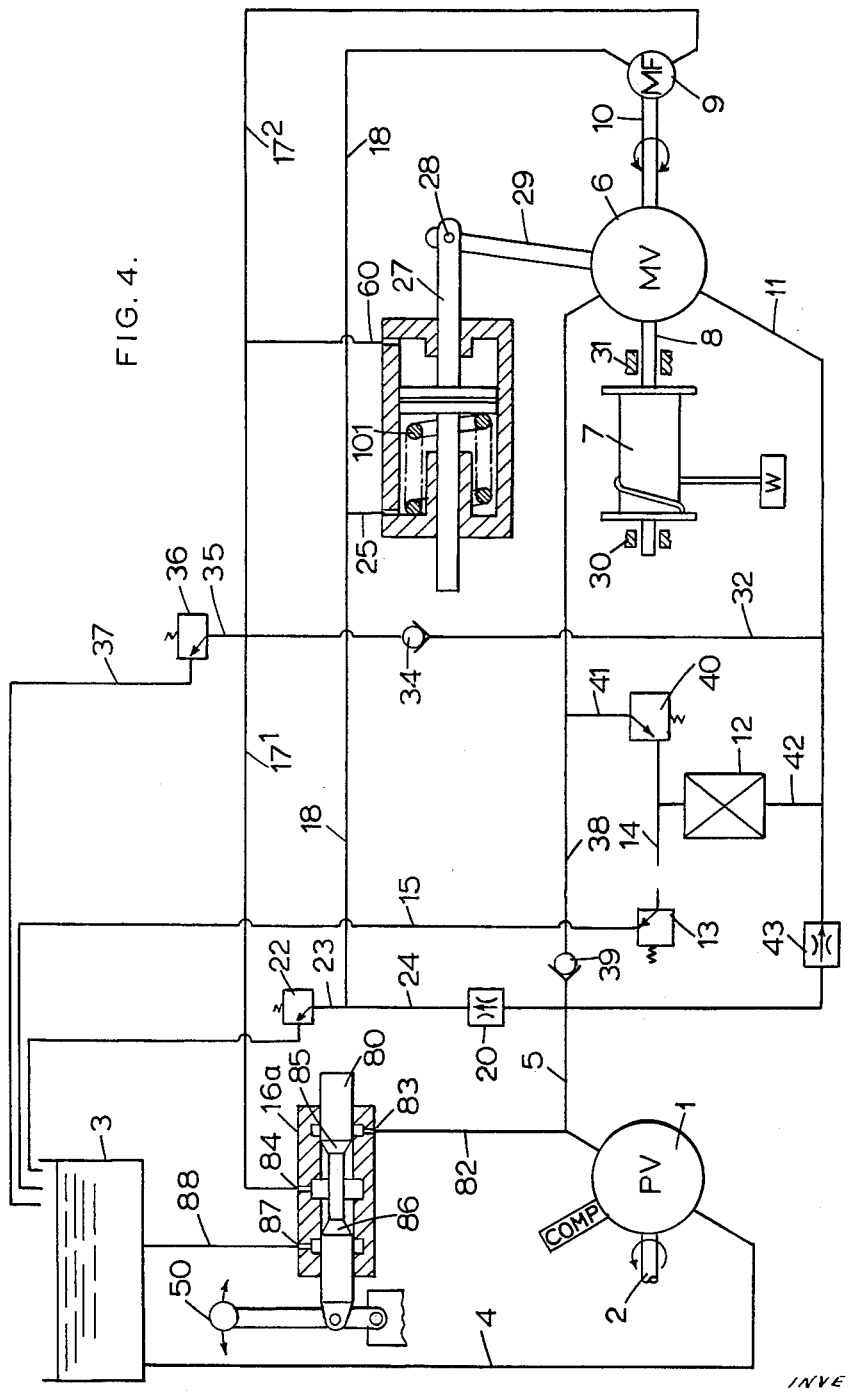
FIG. 4 shows the hydraulic transmission of FIG. 2 but with an operator controlled flow control valve instead of a pump and also showing means for varying the controlled motor speed according to the position of the motor displacement control actuator.

While the fluid quantity supply control described in FIG. 2 is by a variable displacement pump 16, obviously it could be by a fixed displacement pump driven with control of speed and direction, or it could be a valve controlled supply from a suitable pressure source as for example from the pressure line 5. This is illustrated in FIG. 4 in which the directional and flow control valve 16a replaces the pilot pump 16 in an otherwise similar system to that described with reference to FIG. 2.

In the central position (shown) of the operator's control lever 50a of the control valve 16a, all ports are blocked, corresponding to the central position of the displacement control 50 of the pump 16.

Movement of the spool 80 of the valve 16 to the right allows main pressure from the line 5 to pass through the conduit 82 to the port 83 of the valve 16 which communicates with the port 84 connecting with the conduit $17^1$ so that flow passes into such conduit in quantity according to the amount of movement of the spool 80, the chamfers 85 and 86 serving to throttle the fluid passing through the valve. Thus a metered quantity of fluid passes into the conduit $17^1$ to increase the pressure therein and the speed regulation of the motor 6 is in accordance with the selected flow and resultant pressures as described before with reference to FIG. 1.

Movement of the spool 80 to the left closes the flow from the conduit 82 to the conduit $17^1$ and allows fluid in the conduit $17^1$ to pass to the port 87 and thence through the conduit 88 to the reservoir 3, the quantity of flow from the conduit $17^1$ being according to the degree of movement of the spool 80 due to the throttling action of the chamfer 86. Thus fluid is removed from the conduit $17^1$ with speed control action according to the quantity of fluid so passing and that passing through the pump 9, as described before.

The basic control by which the speed of the motor 6 is regulated to a speed according to a selected speed of fluid flow through the operator's control device and the motor driven pump may in practice require speed compensation to reduce the motor driving speed with increase of load on the motor to avoid excessive pressure fluid consumption by the motor.

As the motor load is related to the motor displacement this may be done simply, also as illustrated in FIG. 4 by the introduction of a compression spring 101 in the constant pressure chamber of the jack 26 when speed compensated power output from the motor is required only for power drive in one direction or by oppositely acting springs when power drive is required in both directions.

The operation is as follows:

As the motor 6 is fed from a substantially constant pressure supply, its torque output is directly related to its displacement, which in turn is directly related to the position of the piston 61 of the jack 26 which as previously described, moves to the right to increase the output torque of the motor 6 in the hoist direction and vice versa. The control stabilizes at the speed setting when the displacement of the motor 6, and hence the position of the piston 61, is such that the output torque of the motor 6 corresponds with the resisting torque, primarily due to the value of the load W. In stable conditions there is a particular position of the piston 61 for each load value, the position moving to the right with increase of load value.

In this stable position the forces on each side of the piston 61 are in balance. As the forces to the left of the piston 61 are in FIG. 4 the aggregate of the force resulting from the substantially constant hydraulic pressure in the line 25 (i.e. the set pressure of the relief valve 22) acting on the piston area and the compressive force of the spring 101, which decreases as the piston moves to the right, the balancing hydraulic pressure to the right of the piston is progressively less when the piston is to the right (i.e. when hoisting a heavy load) and greater when the piston is to the left (i.e. when hoisting a lighter load). The pressure in the cylinder of the jack 26 to the right of the piston 61 is also the pressure in the line $17^2$ and hence it is the pressure drop across the operator's control valve 16a between the port 84 and the port 87 which connects with the reservoir 3. Thus the pressure on the valve 16a at the port 84 on selection of hoist direction decreases with increase of load and increases with decrease of load. As the flow through the valve 16a is directly related to the pressure drop across it, at any given setting of the operator's control lever 50, including the maximum power setting, the flow through the valve decreases with increase of load; and as the stable speed of the motor 6 is directly related to the rate of flow in the conduit $17^1$–$17^2$, the stable speed of the motor 6 decreases with increase of load, and increase of torque output, and increases with decreases of load. As the proportional change is related to the relationship of the rate of the spring 101 and the bias pressure from the conduit 25, speed variations in correspondence with load may be varied to suit the system, by selection of an appropriate spring, and regulation of the bias pressure by the setting of the relief valve 22.

When the motor 6 is supplied with a substantially constant pressure fluid, the torque output of such motor is related to the motor displacement (increasing with increase of displacement) and, therefore, to the position of the displacement adjustment means including the actuator. The position of the displacement adjusting means including the actuator is in stable speed condition as determined by the load on the motor, as any increase of displacement from that position causes increasing of torque beyond the opposing load torque and, therefore, increase of speed beyond the control speed and subsequent correction by the control to reduce the displacement of the motor (vice versa for any decrease of displacement).

The spring 101 acts so that reduction of motor displacement occurs progressively at speeds less than the stable speed of the motor, so that speed overshoot is significantly reduced, with consequent increase in the stability of the servo control.

A preferred method of obtaining a wider range or a more versatile form of speed compensation is to arrange for the movement of part of the displacement adjustment means (including the actuator) to act upon a pressure control valve in the flow line to the operator's control valve, so that the fluid pressure across the operator's control valve, and hence the flow through it, at any particular setting, is related to the position of the actuator and hence to the load on the motor. As the speed of the motor is in accordance with the flow through the operator's control valve, the motor speed for any particular setting of the operator's control valve is related to the load upon it.

For example, when it is required to reduce the motor speed for any particular setting (which may be the maximum speed setting) of the operator's control valve with increase of motor load (to limit the motor power output and its consumption of pressure fluid), the actuator acts upon the variable pressure control valve to reduce the controlled pressure with increase of movement towards maximum displacement, so that with increase of motor load, the pressure across the operator's control valve is reduced and the flow through it, and hence the speed of the main motor, is reduced.

Figure 5B:
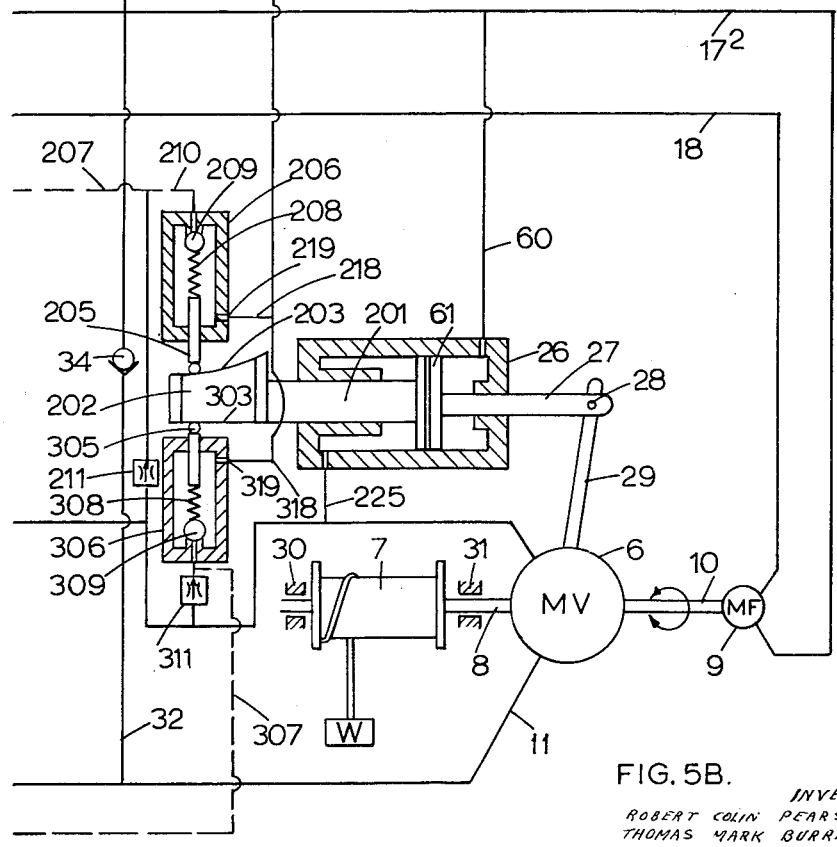
FIGS. 5A and 5B show the hydraulic transmission control with other means to vary the controlled motor speed according to the position of the motor displacement control actuator.
Figure 5A:
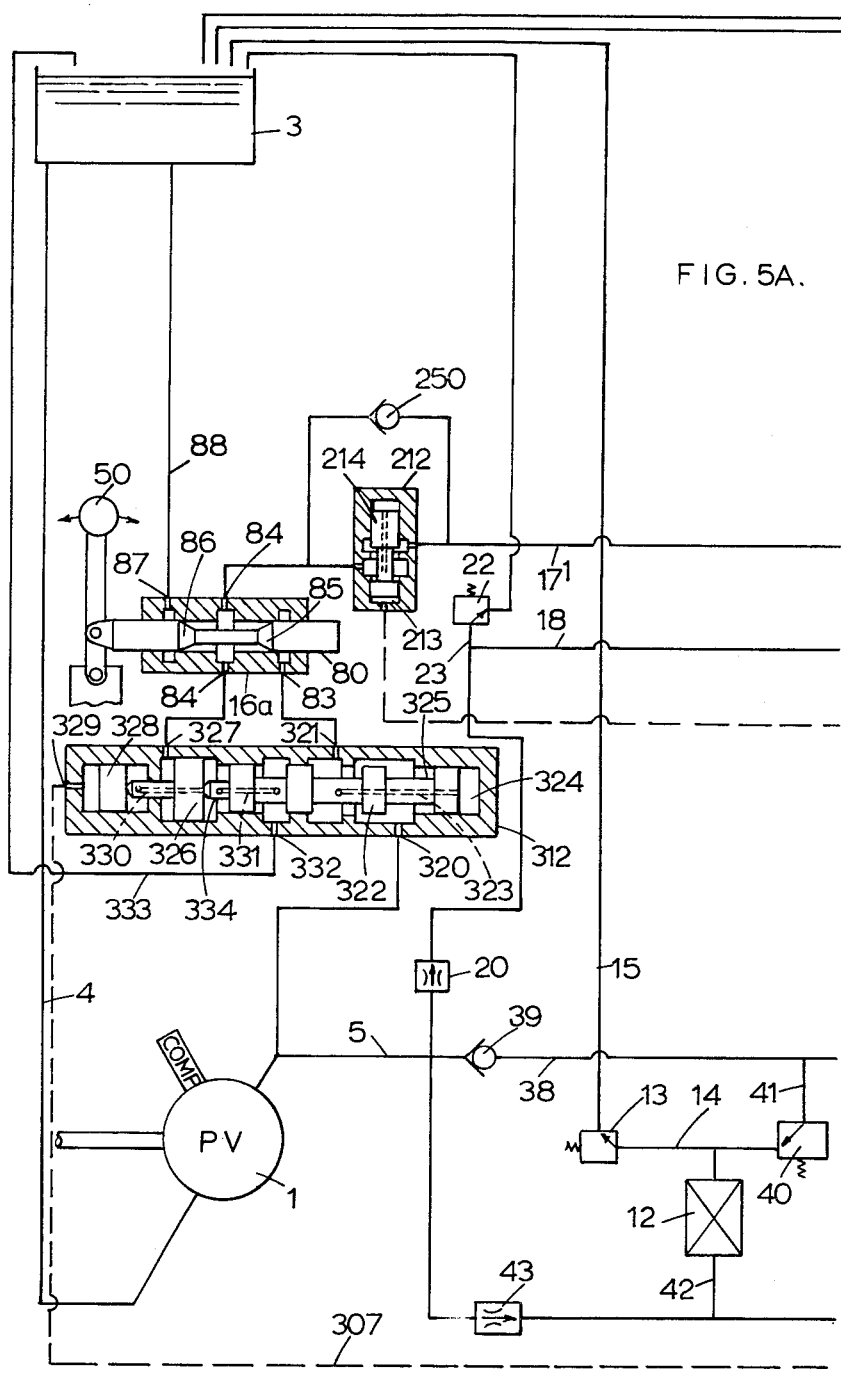

An example of such method of obtaining speed compensation control is illustrated in FIGS. 5A and 5B in which, all items are as previously described except that the left hand end of the jack 26 is shown as fed with constant pressure from the main motor supply line 38 through the conduit 225, and the effective area on the left of the piston 61 is reduced in comparison with that at the right by the piston rod 201 being of greater section than the piston rod 27. This enables a high constant pressure to be applied to the left hand end of the cylinder 26 without need for a correspondingly high control pressure in the conduct $17^1$–$17^2$.

The piston rod 201 is directly connected with the double cam 202 which has two cam faces 203 and 303, 203 being the cam face for hoist and 303 being the cam face for lowering.

Each cam face is abutted by a spring loaded plunger 205 (305) of identical variable pressure relief valves 206 (306) the position of the plunger 205 (305) varying the compression of the spring 208 (308) on the ball valve 209 (309) to vary the inlet pressure to the valve in the conduit 210 (310), this conduit being supplied with a restricted flow from the main pressure supply line 38 through the restrictor 211 (311). Thus the pressure in the conduits 207 (307) is varied by the position of the piston 61 in accordance with the shape and slope of the cam face 203 (303). Drainage of fluid from the valve casing is through the port 219 (319) and the line 218 (318) to tank.

For compensated control of hoist speed to obtain lower speeds at higher output torques and vice versa, a variable pressure reducing valve 212 is fitted in the control line $17^1$ between the line 60 and the port 84 of the control valve 16a, the reduced pressure to the port 84 being in accordance with the pressure in the line 207 which feeds on to the end chamber 213 of the valve 212, the outlet pressure from the valve feeding to the opposite end chamber through a drilling in the spool 214 in accordance with known practice. Thus the pressure into the port 84 of the valve 16a increases and decreases with the pressure in the line 207 and is therefore dependent on the position of the piston 61 and the shape and slope of the cam face 203. Thus the rate of flow through the valve 16a, and hence the stable speed of the motor 6 at any particular position of the control valve 16a is in accordance with the position of the piston 61, which in turn is related to the output torque of the motor 6.

In FIG. 5B the cam face 203 is curved to so control the pressure in the conduit 207, and hence at the inlet to the valve 16a, that the product of the controlled speed of the motor 6 and its output torque remains substantially constant over the working range at the maximum power setting of the control valve 16a.

It is an important feature that this control also gives servo stability, in the same way as described for the control with the compression spring in the cylinder 26, in that the inlet pressure to the valve 16a is less, and hence the speed at which corrective motor displacement control is initiated is less as the motor displacement in the hoist direction increases.

While the compensate the pressure drop across the valve 16a during hoist according to the position of the motor displacement only requires compensated control of the inlet pressure into the port 84 as has been described, as the outlet port 87 is at return to reservoir pressure, compensation of the pressure drop from the port 83 to the port 84 (the flow path when lowering) requires a valve including a feed-back signal from valve 16a outlet pressure (i.e. at the port 84) which is variable.

Such a valve 312, illustrated in FIG. 5A, receives fluid through the port 320 from the main pressure source, and allows it to pass to the outlet port 321 under control by the land 322. The pressure at the outlet port 321 communicates through the drilling 323 in the spool to the end chamber 324 and tends to close off flow from the port 320 to the port 321. In opposition to this force on the spool 325 from the end chamber 324, pressure at the outlet port 84 of the valve 16a is fed to the left hand end of the piston 326 in the valve 312, through the port 327, and pressure from the line 307 is fed to the left hand end of the piston 328 through the port 329. The right hand ends of the pistons 326 and 329 are at return to reservoir pressure communicating through the internal drilling 330 and 331 with the port 332 which returns fluid to the reservoir 3 through the line 333. The piston 326 bears at its right hand end on the extension 334 of the spool 305. The piston 328 bears at its right hand end on the extension 335 of the piston 326.

Assuming the effective areas to the left of pistons 328 and 326 are both equal to the effective area on the spool 325 in the chamber 324, the spool 325 automatically adjust its position such that the pressure in the line at the port 83$d$ equals the sum of the pressures at the port 84$d$ and the signal pressure in the line 307.

Thus in equilibrium the pressure difference across the valve 16$a$ from the port 83$d$ to the port 84$d$ in flow for lowering is in accordance with the pressure in the line 307 which is dependent on the position of the piston 61 and the shape and the slope of the cam face 303. In the illustration shown in FIG. 5B, the cam shown is shaped to give a linear relationship between the displacement of the piston 61 and the resulting pressure in the line 307 and its slope is arranged for some increase of speed while lowering a heavier load (when the motor is acting as a pump), a reduction of motor displacement from maximum load hoist displacement being associated with a lower speed of control when lowering the load.

The non-return valve 250 is fitted in parallel with the valve 212 to enable fluid flow for lowering from the valve 16$a$ to the conduit 17$^1$ as is necessary as will be appreciated from the description of the control.

Instead of the cam 202 with its curved face 203 and linear face 303, a cam 602 shaped substantially as illustrated in FIG. 6 may be used, when the motor 6 is required to give speed compensated power drive in both directions, when its curved/linear surface 602$^1$ and its linear/curved surface 602$^2$ acting on valves such as have been described with reference to FIG. 5 give constant horse-power output (speed x torque=constant) one for forward (drive in the hoist direction) and the other for reverse (drive in the lower direction) operation of the motor 6.

The direct feed of fluid to the jack 26 to and from the conduit 17$^1$–17$^2$ is advantageous, apart from its simplicity, for the rate of flow into or out of the jack is directly related to the speed error (i.e. the flow through the pump 9 in relation to the flow through the valve 16$a$ at the selected setting) and gives a stable operation provided that the rate of correction is sufficiently fast to avoid overshoot i.e. that the volumetric output of the pump 9 per r.p.m. is substantial in relation to the cross-sectional area of the jack 26.

To avoid the power waste by the pump 9 having to be driven by the motor 6 against the pressure in conduit 17$^1$–17$^2$ a small pump may be used in conjunction with a servo-controlled displacement actuator which may take the form shown in FIG. 7 in which movement of the piston 61 of the displacement actuator 26 follows the movement of the piston 561 of the pilot actuator 526 which connects at one end (the left hand end as shown) with the line 17$^2$ through the port 562 and the branch 563, while to apply bias, the other end communicates with the line 18 through the port 501 and the conduit 525.

Differences between flows in the conduits 17$^1$ and 17$^2$ are now effective to move the piston 561 of the pilot actuator 526 so that when fluid enters the port 562 through the conduit 563 due to such a flow difference, the piston 561 moves to the right (as shown) moving the arm 529 through the pin 528, the arm 529 pivoting about the pin 550 housed in the piston rod 28 of the jack 26.

An elongated slot (not shown) in the arm 529 engages with the pin 503 at the end of the spool 512 of the servo valve 505 so that movement of the piston 61 results in movement of the spool 112 in the same direction.

The servo valve comprises the spool 512 with two lands 513 and 514 which in the neutral position block the ports 515 and 516 from the lines 517 and 518 communicating with the ports 559 and 560 respectively of the pack 26.

Main pressure from the conduit 38 is supplied through the conduit 508 to the central port 510 of the servo valve 505 while the end ports 502 and 511 communicate with the reservoir 3 through the conduit 596.

Thus flow into the pilot actuator 526 through the conduit 563 due to flow difference in the lines 17$^1$ and 17$^2$ moves the pilot piston 561 to the right which moves the spool 512 to the right. The position of the lands 512 and 513 then direct fluid pressure from the port 510 to the port 516 and hence to the port 560 of the jack 26 while fluid from the port 559 of the jack 26 is exhausted through the conduit 517 the port 511 and the conduit 596 to the reservoir 3. The resulting movement of the piston 61 to the left returns the spool 512 to the neutral, ports closed, position when the movement of the piston 61 ceases, in accordance with known operation of positional servo mechanisms. The reserve directional movement occurs when fluid flows out of the cylinder 526 through the conduit 563 due to quantity flow differences in the conduits 17$^1$ and 17$^2$. Thus the piston 61 is responsive to the effects of flows in the lines 17$^1$–17$^2$ as described above, but as the pilot actuator 526 may be small in comparison with the main actuator 26, the pump 9 may be smaller and, if desired, the pressure in the line 17$^1$–17$^2$ may be less to reduce power absorption by the pump 9. The pilot actuator 526 may be provided with a bias spring to effect speed compensated output from the motor 6 according to motor load as described with reference to FIG. 4 in relation to the spring 101.

It is also to be noted that the control in the various embodiments described, being a speed control, also functions as an overspeed control for the motor 6, the maximum speed setting being such as to avoid over-speed.

While in each case, for simplicity, the transmission circuit and motor control is described and shown as a winch control suitable for speed control in hoisting and lowering with and without a load, the control is equally applicable to other motor drives in such hydraulic transmissions as, for example, for driving the slewing motion of a crane, as an unidirectional drive for driving a capstan, and other such purposes including vehicle propulsion drives for example the separate motivation of the tracks of a crawler tractor.

We claim:

1. A hydraulic drive comprising: a source of pressure fluid of substantially constant pressure; a hydraulic motor of continuously variable displacement, said motor including a movable control member the position of which controls the magnitude of said displacement; tachometer pump means driven by said motor; manually controllable means for obtaining a variable flow of pressure fluid independently of said tachometer pump means; pressure sensitive means connected to vary the position of said movable control member; a first hydraulic circuit connecting said motor to said source for operation thereby; and a second hydraulic circuit connecting said tachometer pump means and said manually controllable means differentially to said pressure sensitive means.

2. A drive according to claim 1 further comprising compensating means connected to said second hydraulic circuit and responsive to the torque delivered by said motor, said compensating means acting on said pressure sensitive means to maintain the product of the torque and the speed of said motor at a substantially constant magnitude for any particular setting of said manually controllable means.

3. In a hydraulic power transmission including a reversible variable displacement motor, means for controlling the direction and speed of operation of said hydraulic motor including a pump giving a flow of liquid according to its speed and direction of operation, means coupling said pump with said motor for rotation therewith, a manually operable directional and variable quantity flow control means, a conduit connecting said pump with said flow control means, an hydraulic actuator connected to said motor to vary the displacement thereof a branch from said conduit to said actuator, such that with the direction and rate of flow through said conduit determined by the setting of said flow control means then should the speed of said motor cause said pump to pass a quantity flow different from the quantity and direction of flow passed by said flow control means at any setting thereof, such flow difference is effective upon said actuator to vary the displacement of said motor and hence its speed until the motor speed in the direction of operation is such that the flow through said pump substantially equals the flow through said flow control means.

4. In a hydraulic power transmission having an operation and speed control for its variable displacement motor as claimed in claim 3, wherein a constant pressure is maintained on one side of said actuator which as a pressure responsive device operates according to any difference between the force due to said constant pressure on its one side and the force in said branch acting on its opposite side of a flow difference due to the operation of said pump coupled to said hydraulic motor and the setting of said manually operable flow control device.

5. In a hydraulic power transmission having an operation and speed control for its variable displacement motor as claimed in claim 3 wherein a part movable with said actuator has means effective upon a pressure controlling valve means effective to regulate the rate of flow through said flow control means at any given setting thereof according to the displacement of said hydraulic motor.

6. In a hydraulic power transmission having an operation and speed control for its variable displacement motor as claimed in claim 5, wherein said movable part is a cam the contour of which due to its movement varies the setting of said pressure controlling valve means.

7. In a hydraulic power transmission having an operation and speed control for its variable displacement motor as claimed in claim 3 wherein fluid in said branch from said conduit is effective on servo means effective to said actuator, which servo means may incorporate a spring bias.

8. In a hydraulic power transmission, having an operation and speed control for its variable displacement motor as claimed in claim 3, wherein said actuator has spring loading to obtain variation of control speed with variation of load on said motor at any particular setting of said flow control means.

9. In a hydraulic power transmission in which a main pump supplies fluid to drive a hydraulic motor which is of the type having externally operable means for varying its displacement and hence its speed of operation, means for controlling the operation and speed of said motor including a pump driven by said motor, a manually operable variable flow control means, fluid flow connections to said pump and said flow control means including an interconnecting conduit, an hydraulic actuator connected to said externally operable means thereby to effect change of displacement of said motor, a branch from said conduit to said actuator whereby a difference in the rates of flow through said pump and said flow control means causes fluid through said branch to move said actuator to alter the displacement of said motor until the flow through said pump at the speed of said motor substantially equals that through said flow control means at the setting thereof.

References Cited by the Examiner
UNITED STATES PATENTS

| 2,369,397 | 2/45 | Kostenick | 73—523 X |
| 2,392,262 | 1/46 | Ramsey | 73—523 X |
| 2,618,324 | 11/52 | Jordan | 73—523 X |

FOREIGN PATENTS

| 21,406 | 1900 | Great Britain. |

RICHARD B. WILKINSON, *Primary Examiner.*